(12) United States Patent
Bialer et al.

(10) Patent No.: US 11,119,204 B2
(45) Date of Patent: Sep. 14, 2021

(54) ANGULAR RESOLUTION ENHANCEMENT USING NON-COHERENT RADAR SYSTEMS

(71) Applicant: GM Global Technology Operations LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 307 days.

(21) Appl. No.: 16/433,459

(22) Filed: Jun. 6, 2019

(65) Prior Publication Data

US 2020/0386878 A1 Dec. 10, 2020

(51) Int. Cl.
*G01S 13/42* (2006.01)
*G01S 7/35* (2006.01)
*G01S 13/87* (2006.01)

(52) U.S. Cl.
CPC ............ *G01S 13/424* (2013.01); *G01S 7/352* (2013.01); *G01S 13/872* (2013.01)

(58) Field of Classification Search
CPC ...... G01S 13/343; G01S 13/42; G01S 13/424; G01S 13/872; G01S 13/878; G01S 13/931; G01S 7/352
See application file for complete search history.

(56) References Cited

U.S. PATENT DOCUMENTS

| | | | | |
|---|---|---|---|---|
| 2015/0331086 | A1* | 11/2015 | Hassen | G01S 13/02 342/175 |
| 2017/0176583 | A1* | 6/2017 | Gulden | G01S 13/32 |
| 2020/0300965 | A1* | 9/2020 | Wu | G01S 13/931 |

* cited by examiner

*Primary Examiner* — Timothy A Brainard
(74) *Attorney, Agent, or Firm* — Cantor Colburn LLP

(57) ABSTRACT

Systems and methods include emitting transmit signals from two or more non-coherent radar systems. A method also includes receiving reflected signals at the two or more non-coherent radar systems based respectively on the transmit signals from each of the two or more non-coherent radar systems being reflected by one or more objects. The non-coherent radar systems exhibit an uncorrelated phase relationship in the reflected signals received at each of the two or more non-coherent radar systems. The reflected signals are processed to obtain a joint metric that is used to identify and estimate an angle to each of the one or more objects.

20 Claims, 4 Drawing Sheets

ANGULAR RESOLUTION ENHANCEMENT USING NON-COHERENT RADAR SYSTEMS

INTRODUCTION

The subject disclosure relates to angular resolution enhancement using non-coherent radar systems.

Vehicles (e.g., automobiles, trucks, construction equipment, farm equipment, automated factory equipment) are increasingly outfitted with sensors to provide information about the vehicle and its surroundings. Exemplary sensors include a radio detection and ranging (radar) system, a light detection and ranging (lidar) system, and a camera. A radar system, for example, involves the transmission of a radio frequency (RF) signal and reception of reflections of that signal by one or more objects in the field of view of the radar system. Processing of the reflections provides a range and angle to each object and may also provide relative range rate (i.e., Doppler). A fast Fourier transform (FFT) may be used to determine the range while a beamforming process may be used to determine the angle. The distance between objects can be less than a distance that can be distinguished based on the angular resolution of the radar system. Accordingly, it is desirable to provide angular resolution enhancement using non-coherent radar systems.

SUMMARY

In one exemplary embodiment, a method includes emitting transmit signals from two or more non-coherent radar systems, and receiving reflected signals at the two or more non-coherent radar systems based respectively on the transmit signals from each of the two or more non-coherent radar systems being reflected by one or more objects. The non-coherent radar systems exhibit an uncorrelated phase relationship in the reflected signals received at each of the two or more non-coherent radar systems. The reflected signals are processed to obtain a joint metric that is used to identify and estimate an angle to each of the one or more objects.

In addition to one or more of the features described herein, the processing the reflected signals includes obtaining a set of reflection likelihood values $z_i(p)$ associated with each i of the non-coherent radar systems at every point p that indicates a range and azimuth or the range, the azimuth, and an elevation.

In addition to one or more of the features described herein, the set of reflection likelihood values for each of the non-coherent radar systems is given by:

$$z_i(p)=|r^H(p)y_i|, \text{ where}$$

$y_i$ is the reflected signal received at the non-coherent radar system, H indicates a Hermitian transform, and r(p) is a synthetic reflection signal generated for the non-coherent radar system at each point p.

In addition to one or more of the features described herein, each of the synthetic reflection signals is given by:

$$r_i(t,p)=\sin(2\pi f_c\tau_i(p)-\pi\alpha\tau_i^2(p)+2\pi\alpha\tau_i(p)t), \text{ where}$$

the transmit signal is a linear frequency modulated signal, t is a duration for which the transmit signal dwelled on the point p, fc is a carrier frequency of the transmit signal, τ is a delay proportional to a distance between the point p and the non-coherent radar system, and α is a slope of the linear frequency modulated signal.

In addition to one or more of the features described herein, obtaining the joint metric is based on the set of reflection likelihood values $z_i$ for each of the two or more non-coherent radar systems at each point.

In addition to one or more of the features described herein, the obtaining the joint metric includes obtaining a product of the set of reflection likelihood values $z_i$ for each of the two or more non-coherent radar systems at each point.

In addition to one or more of the features described herein, the obtaining the joint metric includes obtaining a function that is proportional to a product of the set of reflection likelihood values $z_i$ for each of the two or more non-coherent radar systems at each point.

In addition to one or more of the features described herein, the obtaining the joint metric includes obtaining, at each point, a sorting of the reflection likelihood value at the point for the two or more non-coherent radar systems as:

$$u_1, u_2, \ldots, u_N = \text{sort}(z_1, z_2, \ldots, z_N), \text{ and}$$

obtaining the joint metric includes using the L highest reflection likelihood values:

$$\mu = \Pi_{i=L+1}^{N} u_i, \text{ where}$$

N is a number of the two or more non-coherent radar systems and L is a selected value.

In addition to one or more of the features described herein, identifying and estimating the angle to each of the one or more objects includes applying a threshold to the joint metric.

In addition to one or more of the features described herein, the method also includes disposing the two or more non-coherent radar systems in a vehicle.

In another exemplary embodiment, a system includes two or more non-coherent radar systems to emit transmit signals and receive reflected signals based respectively on the transmit signals from each of the two or more non-coherent radar systems being reflected by one or more objects. The non-coherent radar systems exhibit an uncorrelated phase relationship in the reflected signals received at each of the two or more non-coherent radar systems. The system also includes a processor to process the reflected signals to obtain a joint metric that is used to identify and estimate an angle to each of the one or more objects.

In addition to one or more of the features described herein, the processor obtains a set of reflection likelihood values $z_i(p)$ associated with each i of the non-coherent radar systems at every point p that indicates a range and azimuth or the range, the azimuth, and an elevation.

In addition to one or more of the features described herein, the set of reflection likelihood values for each of the non-coherent radar systems is given by:

$$z_i(p)=|r^H(p)y_i|, \text{ where}$$

$y_i$ is the reflected signal received at the non-coherent radar system, H indicates a Hermitian transform, and r(p) is a synthetic reflection signal generated for the non-coherent radar system at each point p.

In addition to one or more of the features described herein, each of the synthetic reflection signals is given by:

$$r_i(t,p)=\sin(2\pi f_c\tau_i(p)-\pi\alpha\tau_i^2(p)+2\pi\alpha\tau_i(p)t), \text{ where}$$

the transmit signal is a linear frequency modulated signal, t is a duration for which the transmit signal dwelled on the point p, fc is a carrier frequency of the transmit signal, τ is a delay proportional to a distance between the point p and the non-coherent radar system, and α is a slope of the linear frequency modulated signal.

In addition to one or more of the features described herein, wherein the processor obtains the joint metric based on the set of reflection likelihood values $z_i$ for each of the two or more non-coherent radar systems at each point.

In addition to one or more of the features described herein, the processor obtains the joint metric as a product of the set of reflection likelihood values $z_i$ for each of the two or more non-coherent radar systems at each point.

In addition to one or more of the features described herein, the processor obtains the joint metric as a function that is proportional to a product of the set of reflection likelihood values $z_i$ for each of the two or more non-coherent radar systems at each point.

In addition to one or more of the features described herein, the processor is further configured to obtain the joint metric by obtaining, at each point, a sorting of the reflection likelihood value at the point for the two or more non-coherent radar systems as:

$$u_1, u_2, \ldots, u_N = \text{sort}(z_1, z_2, \ldots, z_N), \text{ and}$$

obtaining the joint metric includes using the L highest reflection likelihood values:

$$\mu = \Pi_{i=L+1}^{N} u_i, \text{ where}$$

N is a number of the two or more non-coherent radar systems and L is a selected value.

In addition to one or more of the features described herein, the processor identifies and estimates the angle to each of the one or more objects by applying a threshold to the joint metric.

In addition to one or more of the features described herein, the two or more non-coherent radar systems are in a vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
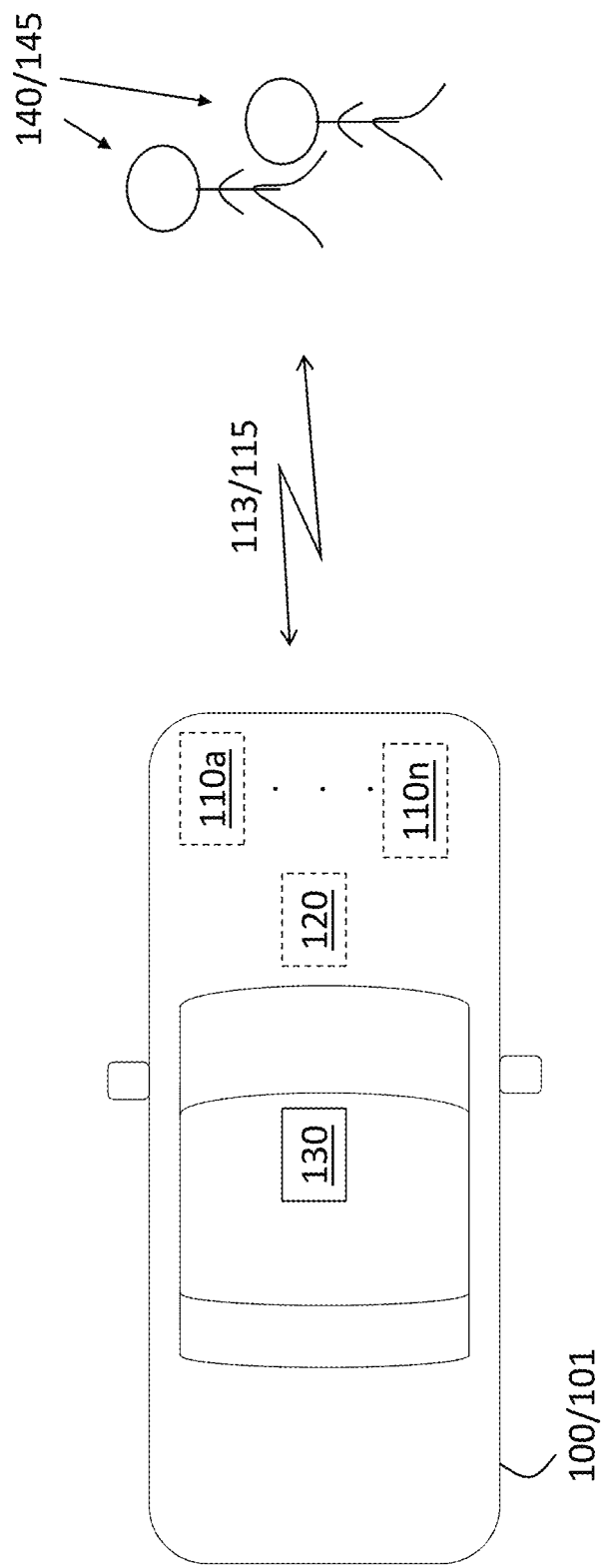
FIG. 1 is a block diagram of a vehicle that benefits from angular resolution enhancement using non-coherent radar systems according to one or more embodiments.

The following description is merely exemplary in nature and is not intended to limit the present disclosure, its application or uses. It should be understood that throughout the drawings, corresponding reference numerals indicate like or corresponding parts and features.

As previously noted, close objects may not be distinguished properly during the beamforming process of a radar system. A prior approach to enhancing angular resolution involves using more than one radar system where the radar systems are coherent. In coherent radar systems, phases are correlated such that the phase differences in the reflected signals received at each of the coherent radar systems is related to the angle of arrival. Thus, the phase differences facilitate increased angular resolution. However, using two or more coherent radar systems entails increased complexity. Embodiments of the systems and methods detailed herein relate to providing angular resolution enhancement using non-coherent radar systems. The non-coherent radar systems each have free running clocks, and, unlike with coherent radar systems, the phase differences in the reflected signals received at each of the non-coherent radar systems do not provide additional information about the angle to the object. Instead, a joint likelihood metric is obtained based on the non-coherent radar systems, as detailed herein. This joint likelihood metric facilitates enhanced angular resolution according to one or more embodiments.

In accordance with an exemplary embodiment, FIG. 1 is a block diagram of a vehicle 100 that benefits from angular resolution enhancement using non-coherent radar systems 110. The exemplary vehicle 100 shown in FIG. 1 is an automobile 101. The vehicle 100 is shown to include non-coherent radar systems 110a through 110n (generally referred to as 110). In addition to the radar systems 110, the vehicle 100 may include additional sensors 130 (e.g., lidar system, camera). A controller 120 may control aspects of the operation of the vehicle 100 using information from the radar systems 110 and/or other sensors 130. Each of the radar systems 110 emits transmit signals 113. Transmit signals 113 that encounter an object 140 (e.g., another vehicle 100, a pedestrian 145, a road sign) provide reflected signals 115 that are received by each of the radar systems 110.

The processing of reflected signals 115 received by the radar systems 110 may be performed within the radar systems 110, by the controller 120, or a combination of the two. The processing, whether in the radar systems 110 or controller 120, involves processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. Two closely spaced exemplary objects 140 (pedestrians 145) are shown in FIG. 1. According to one or more embodiments, the angle to each of the two pedestrians 145 can be resolved based on using the non-coherent radar systems 110.

Figure 2:
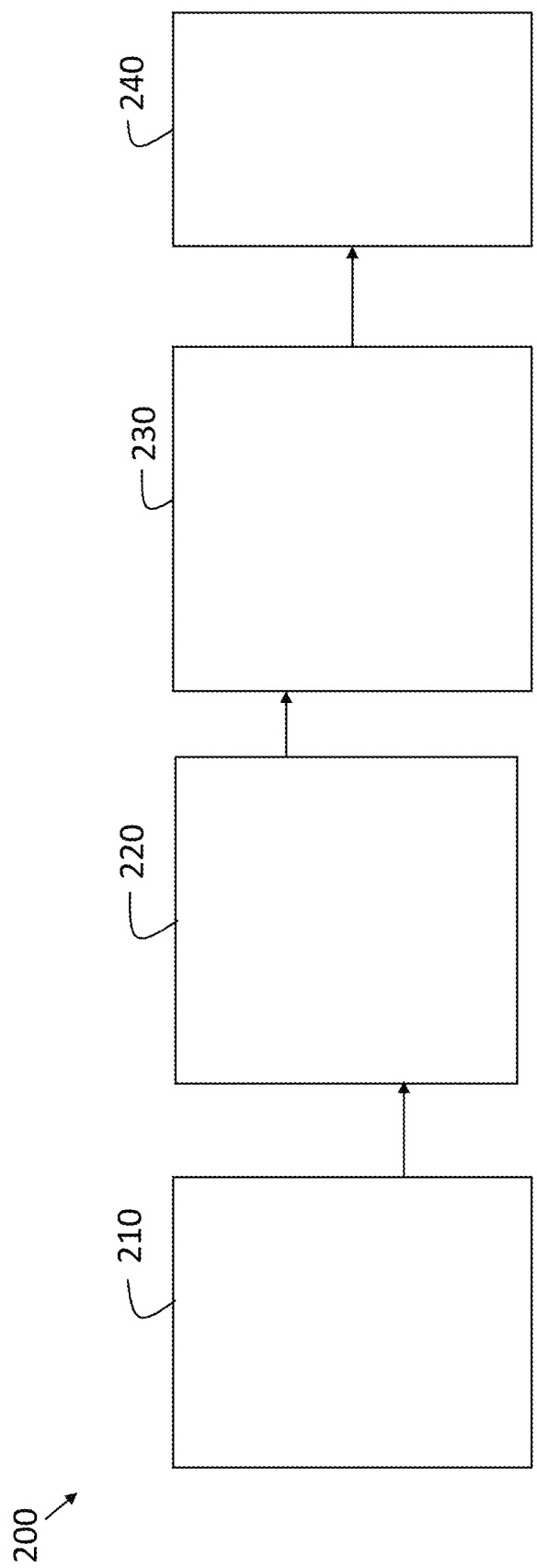
FIG. 2 is a process flow of a method of enhancing angular resolution using non-coherent radar systems according to one or more embodiments.

FIG. 2 is a process flow of a method 200 of enhancing angular resolution using non-coherent radar systems 110 according to one or more embodiments. At block 210, receiving reflected signals 115 at the radar systems 110 refers to each of the radar systems 110 emitting transmit signals 113 and receiving reflected signals 115 that result from the transmit signal 113. The reflected signals 115 received at a given radar system 110 based on the transmit signal 113 of another radar system 110 are not used in this process. The reflected signal 115 received at a given radar system 110 $i$ is represented as $y_i(t)$ and a corresponding synthetic received signal is represented as $r_i(t,p)$, where p is a reflection point on the object 140 that reflected the transmit signal 113.

In an exemplary case, the transmit signal 113 is a linear frequency modulated continuous wave (LFMCW) signal (i.e., chirp) with a linearly increasing or decreasing frequency over a period of the signal (i.e., the dwell time). In that exemplary case, the synthetic received signal $r_i(t,p)$ is given by:

$$r_i(t,p) = \sin(2\pi f_c \tau_i(p) - \pi \alpha \tau_i^2(p) + 2\pi \alpha \tau_i(p) t) \quad [\text{EQ. 1}]$$

The time t is between 0 and the dwell time, which is the duration during which the transmit signal 113 is emitted to the point p. In addition, $f_c$ is the carrier frequency of the transmit signal 113, $\tau$ is a delay that is proportional to the distance between the reflection point p and the radar system 110, and $\alpha$ is the chirp slope. Thus, each radar system 110 has a corresponding synthetic received signal $r_i(t,p)$.

At block 220, obtaining a reflection likelihood for each radar system 110 is based on correlating the reflected signal 115 received at a given radar system 110 with its corresponding synthetic received signal r(p) of reflection point hypotheses (i.e., reflection likelihood at each point p). This process is a match filter. The point p at which the reflected signal 115 has the highest correlation with the reflection point hypothesis, r(p), corresponds to the actual reflection point p. For a given radar system 110 $i$, the reflection likelihood z(p) is given as:

$$z_i(p) = |r^H(p) y_i| \quad \text{[EQ. 2]}$$

In EQ. 2, the H refers to a Hermitian transpose. The reflection likelihood is further discussed with reference to FIG. 3.

At block 230, combining the reflection likelihoods $z_i$ of the radar systems 110 to obtain a joint likelihood metric $\mu$ is based on a product of the reflection likelihood $z_i$ associated with each radar system 110. That is, the joint likelihood metric $\mu$ may be given by:

$$\mu = z_1 * z_2 * \ldots * z_n \quad \text{[EQ. 3]}$$

Alternately, the joint likelihood metric $\mu$ may be a function that is proportional to the product of the reflection likelihoods. For example, the reflection likelihoods of N radar systems 110 may be sorted from low to high at each point p:

$$u_1, u_2, \ldots, u_N = \text{sort}(z_1, z_2, \ldots, z_N) \quad \text{[EQ. 4]}$$

The highest L reflection likelihoods at the point p may then be used to determine the joint likelihood metric $\mu$ as:

$$\mu = \Pi_{i=L+1}^{N} u_i \quad \text{[EQ. 5]}$$

The value of L may be chosen to balance resolution with robustness.

The joint likelihood metric $\mu$ is obtained according to EQ. 3 or based on a function, according to EQ. 5, for example, for every two-dimensional or three-dimensional spatial point p. That is, a joint likelihood metric $\mu$ value is obtained for every range, azimuth, and elevation if the arrangement of the antennas of the radar systems 110 facilitates a determination of elevation in addition to azimuth. If elevation information is not available, each spatial point p indicates a range and azimuth. Because a product is used, the value of the joint likelihood metric $\mu$ is significantly reduced when any one of the reflection likelihoods z is low. This contributes to the enhanced angular resolution, as discussed with reference to FIG. 4. At block 240, detecting objects and estimating the angle to each object is based on the joint likelihood metric $\mu$. Specifically, the range and azimuth corresponding with any joint likelihood metric $\mu$ value that exceeds a threshold value is deemed to be the location of an object 140 that resulted in a reflected signal 115.

Figure 3:
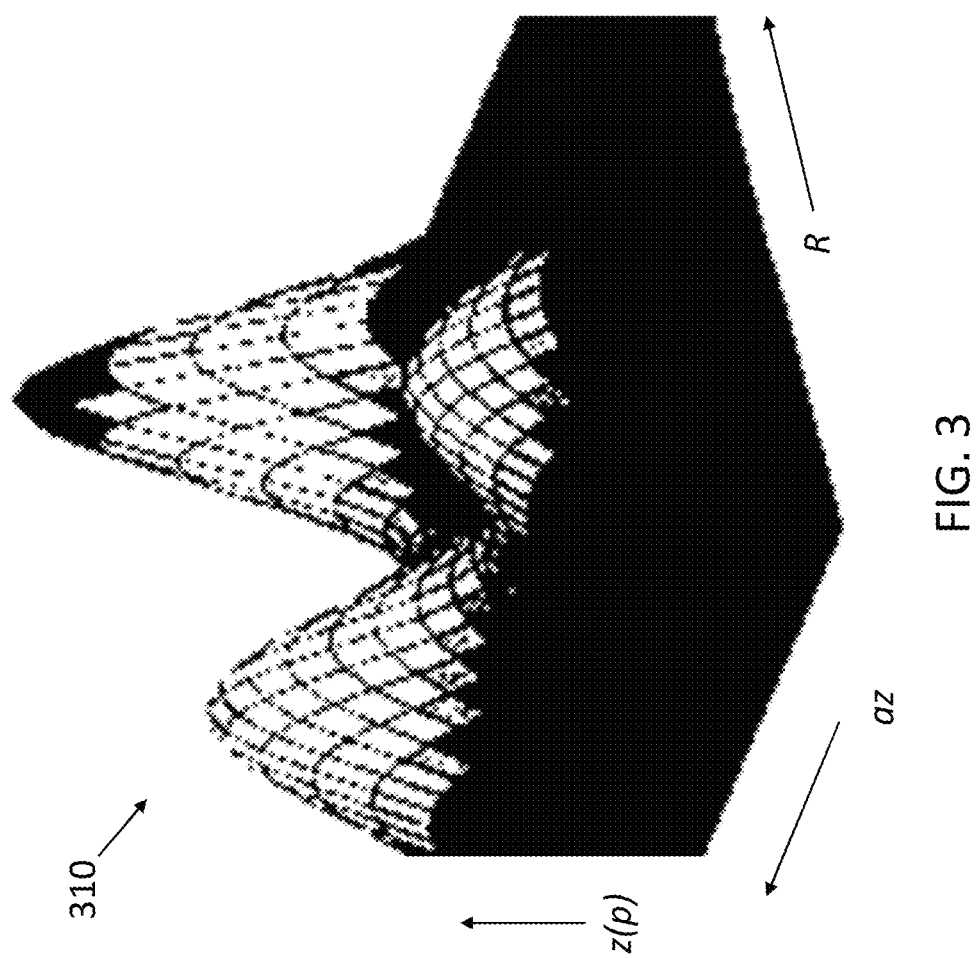
FIG. 3 shows an exemplary image of the reflection likelihood, obtained according to the method shown in FIG. 2, at a given radar system.

FIG. 3 shows an exemplary image 310 of the reflection likelihood, obtained at block 220, at a given radar system 110. As shown, for a given radar system 110, the reflection likelihood z(p) is indicated for a set of values of range R and azimuth az. The range R and azimuth az associated with the highest values of the reflection likelihood z(p) (i.e., the peaks) suggest the presence of reflective points that provided reflected signals 115. The points may be associated with one or more objects 140. In the exemplary image 310 shown in FIG. 3, three areas of reflective points are indicated.

Figure 4:
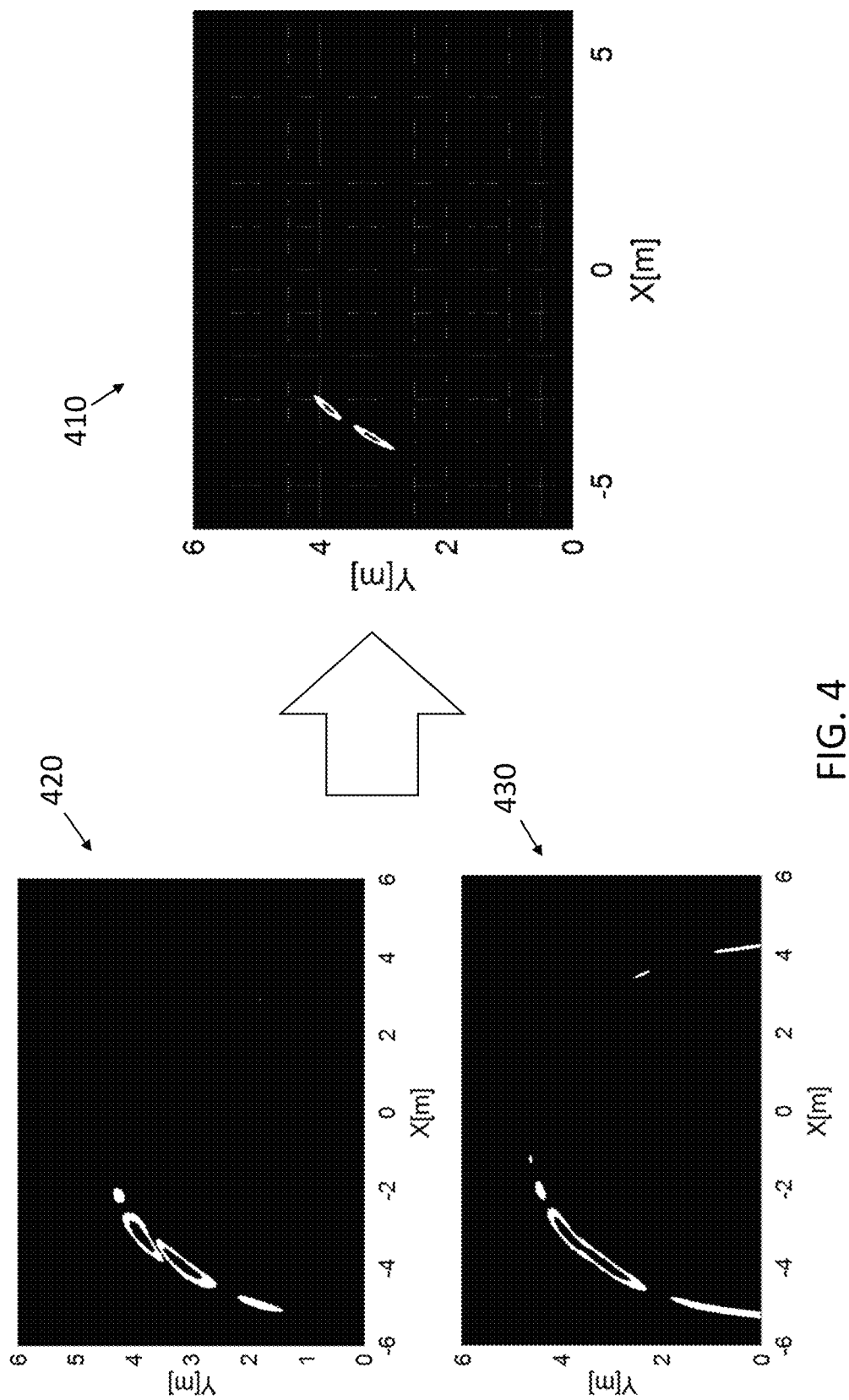
FIG. 4 shows an image indicating the joint likelihood metric p values that result from using two exemplary non-coherent radar systems according to one or more embodiments.

FIG. 4 shows an image 410 indicating the joint likelihood metric $\mu$ values that result from using two exemplary non-coherent radar systems 110 according to one or more embodiments. The image 420 shows the reflection likelihood as a function of X and Y in meters (m) for one of the two non-coherent radar systems 110, and the image 430 shows the reflection likelihood as a function of X and Y in meters (m) for the other of the two non-coherent radar systems 110. The joint likelihood metric $\mu$ is a product or is proportional to the product of the reflection likelihoods of the two non-coherent radar systems 110. That is, the image 410 is a product or is proportional to the product of the two images 420 and 430.

The images 410, 420, and 430 are obtained based on two exemplary objects 140 being in the field of view of the two non-coherent radar systems 110, as shown in FIG. 1. As the reflection likelihood image 430 indicates, the reflection likelihood values associated with the two objects 140 have merged such that the image 430 suggests the presence of one object 140. However, the image 420, which shows the reflection likelihood values for the other radar system 110, does not evidence the same merging of values. That is, reflection likelihood values at X and Y values between the two objects 140 are low in the image 420. Because the joint likelihood metric $\mu$ is a product or is proportional to the product of the reflection likelihoods of the two non-coherent radar systems 110, the low reflection likelihood values between the X and Y positions of the objects 140 in the image 420 ensure that the joint likelihood metric $\mu$ values between the X and Y positions of the objects 140 are also low. That is, improved resolution in even one of the non-coherent radar systems 110 (the one associated with image 420 in the exemplary case) facilitates the merge evidenced by image 430 being avoided in image 410. This results in enhanced resolution in the positions of the two exemplary objects 140 when the joint likelihood metric $\mu$ is used for detection and positioning.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method, comprising:
   emitting transmit signals from two or more non-coherent radar systems;
   receiving reflected signals at the two or more non-coherent radar systems based respectively on the transmit signals from each of the two or more non-coherent radar systems being reflected by one or more objects, wherein the non-coherent radar systems exhibit an uncorrelated phase relationship in the reflected signals received at each of the two or more non-coherent radar systems; and
   processing the reflected signals to obtain a joint metric that is used to identify and estimate an angle to each of the one or more objects.

2. The method according to claim 1, wherein the processing the reflected signals includes obtaining a set of reflection likelihood values $z_i(p)$ associated with each i of the non-coherent radar systems at every point p that indicates a range and azimuth or the range, the azimuth, and an elevation.

3. The method according to claim 2, wherein the set of reflection likelihood values for each of the non-coherent radar systems is given by:

$$z_i(p)=|r^H(p)y_i|, \text{ where}$$

$y_i$ is the reflected signal received at the non-coherent radar system, H indicates a Hermitian transform, and r(p) is a synthetic reflection signal generated for the non-coherent radar system at each point p.

4. The method according to claim 3, wherein each of the synthetic reflection signals is given by:

$$r_i(t,p)=\sin(2\pi f_c \tau_i(p) - \pi \alpha \tau_i^2(p) + 2\pi \alpha \tau_i(p)t), \text{ where}$$

the transmit signal is a linear frequency modulated signal, t is a duration for which the transmit signal dwelled on the point p, fc is a carrier frequency of the transmit signal, $\tau$ is a delay proportional to a distance between the point p and the non-coherent radar system, and $\alpha$ is a slope of the linear frequency modulated signal.

5. The method according to claim 2, wherein obtaining the joint metric is based on the set of reflection likelihood values $z_i$ for each of the two or more non-coherent radar systems at each point.

6. The method according to claim 5, wherein the obtaining the joint metric includes obtaining a product of the set of reflection likelihood values $z_i$ for each of the two or more non-coherent radar systems at each point.

7. The method according to claim 5, wherein the obtaining the joint metric includes obtaining a function that is proportional to a product of the set of reflection likelihood values $z_i$ for each of the two or more non-coherent radar systems at each point.

8. The method according to claim 7, wherein the obtaining the joint metric includes obtaining, at each point, a sorting of the reflection likelihood value at the point for the two or more non-coherent radar systems as:

$$u_1, u_2, \ldots, u_N = \text{sort}(z_1, z_2, \ldots, z_N), \text{ and}$$

obtaining the joint metric includes using the L highest reflection likelihood values:

$$\mu = \Pi_{i=L+1}^{N} u_i, \text{ where}$$

N is a number of the two or more non-coherent radar systems and L is a selected value.

9. The method according to claim 1, wherein identifying and estimating the angle to each of the one or more objects includes applying a threshold to the joint metric.

10. The method according to claim 1, further comprising disposing the two or more non-coherent radar systems in a vehicle.

11. A system, comprising:
two or more non-coherent radar systems configured to emit transmit signals and receive reflected signals based respectively on the transmit signals from each of the two or more non-coherent radar systems being reflected by one or more objects, wherein the non-coherent radar systems exhibit an uncorrelated phase relationship in the reflected signals received at each of the two or more non-coherent radar systems; and a processor configured to process the reflected signals to obtain a joint metric that is used to identify and estimate an angle to each of the one or more objects.

12. The system according to claim 11, wherein the processor is configured to obtain a set of reflection likelihood values $z_i(p)$ associated with each i of the non-coherent radar systems at every point p that indicates a range and azimuth or the range, the azimuth, and an elevation.

13. The system according to claim 12, wherein the set of reflection likelihood values for each of the non-coherent radar systems is given by:

$$z_i(p)=|r^H(p)y_i|, \text{ where}$$

$y_i$ is the reflected signal received at the non-coherent radar system, H indicates a Hermitian transform, and r(p) is a synthetic reflection signal generated for the non-coherent radar system at each point p.

14. The system according to claim 13, wherein each of the synthetic reflection signals is given by:

$$r_i(t,p)=\sin(2\pi f_c \tau_i(p) - \pi \alpha \tau_i^2(p) + 2\pi \alpha \tau_i(p)t), \text{ where}$$

the transmit signal is a linear frequency modulated signal, t is a duration for which the transmit signal dwelled on the point p, fc is a carrier frequency of the transmit signal, $\tau$ is a delay proportional to a distance between the point p and the non-coherent radar system, and $\alpha$ is a slope of the linear frequency modulated signal.

15. The system according to claim 12, wherein the processor is configured to obtain the joint metric based on the set of reflection likelihood values $z_i$ for each of the two or more non-coherent radar systems at each point.

16. The system according to claim 15, wherein the processor is further configured to obtain the joint metric as a product of the set of reflection likelihood values $z_i$ for each of the two or more non-coherent radar systems at each point.

17. The system according to claim 15, wherein the processor is further configured to obtain the joint metric as a function that is proportional to a product of the set of reflection likelihood values $z_i$ for each of the two or more non-coherent radar systems at each point.

18. The system according to claim 17, wherein the processor is further configured to obtain the joint metric by obtaining, at each point, a sorting of the reflection likelihood value at the point for the two or more non-coherent radar systems as:

$$u_1, u_2, \ldots, u_N = \text{sort}(z_1, z_2, \ldots, z_N), \text{ and}$$

obtaining the joint metric includes using the L highest reflection likelihood values:

$$\mu = \Pi_{i=L+1}^{N} u_i, \text{ where}$$

N is a number of the two or more non-coherent radar systems and L is a selected value.

19. The system according to claim 11, wherein the processor is configured to identify and estimate the angle to each of the one or more objects by applying a threshold to the joint metric.

20. The system according to claim 11, wherein the two or more non-coherent radar systems are in a vehicle.

* * * * *